United States Patent
Box et al.

(10) Patent No.: US 10,016,111 B2
(45) Date of Patent: *Jul. 10, 2018

(54) VACUUM CLEANER WITH MOTOR COOLING

(71) Applicant: Dyson Technology Limited, Wiltshire (GB)

(72) Inventors: Charles Geoffrey Box, Swindon (GB); Mark Andrew Johnson, Bath (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/919,609

(22) Filed: Oct. 21, 2015

(65) Prior Publication Data

US 2016/0113467 A1    Apr. 28, 2016

(30) Foreign Application Priority Data

Oct. 22, 2014    (GB) .................................. 1418795.9

(51) Int. Cl.
| | |
|---|---|
| *A47L 9/00* | (2006.01) |
| *A47L 9/16* | (2006.01) |
| *A47L 9/28* | (2006.01) |
| *A47L 5/22* | (2006.01) |

(Continued)

(52) U.S. Cl.
CPC .............. *A47L 9/2889* (2013.01); *A47L 5/22* (2013.01); *A47L 9/00* (2013.01); *A47L 9/165* (2013.01); *A47L 9/1616* (2013.01); *A47L 9/1633* (2013.01); *A47L 9/1641* (2013.01); *A47L 9/22* (2013.01); *H02K 9/06* (2013.01); *A47L 9/28* (2013.01)

(58) Field of Classification Search
CPC ..... A47L 9/28; A47L 9/16; A47L 9/65; A47L 9/2889
USPC ......................................... 15/327.1, 347, 353
See application file for complete search history.

(56) References Cited

U.S. PATENT DOCUMENTS 3,866,263 A * 2/1975 Crouser ................ A47L 9/0081
                                                              15/327.7
5,267,371 A    12/1993 Soler et al.
(Continued)

FOREIGN PATENT DOCUMENTS

| CN | 1879974 | 12/2006 |
|---|---|---|
| CN | 103142191 | 6/2013 |

(Continued)

OTHER PUBLICATIONS

International Search Report and Written Opinion dated Apr. 25, 2016, directed to International Application No. PCT/GB2015/052986; 15 pages.

(Continued)

*Primary Examiner* — Michael Jennings
(74) *Attorney, Agent, or Firm* — Morrison & Foerster LLP

(57) ABSTRACT

A vacuum cleaner having a dirt-separation stage and a vacuum motor for moving air through the dirt-separation stage. The vacuum motor includes an impeller driven by an electric motor. The impeller is then located upstream of the dirt-separation stage, the electric motor is located downstream of the dirt-separation stage, and at least part of the air discharged from the dirt-separation stage is used to cool the electric motor.

20 Claims, 5 Drawing Sheets

(51) Int. Cl.
*A47L 9/22* (2006.01)
*H02K 9/06* (2006.01)

(56) References Cited

U.S. PATENT DOCUMENTS

| | | | | |
|---|---|---|---|---|
| 5,592,716 | A | * | 1/1997 | Moren ............. A47L 9/22 15/412 |
| 5,638,575 | A | * | 6/1997 | Sin .................. A47L 5/22 15/344 |
| 5,815,881 | A | | 10/1998 | Sjögreen |
| 5,974,623 | A | * | 11/1999 | Cummins ........... A47L 5/12 15/347 |
| 6,175,988 | B1 | * | 1/2001 | White ................ A47L 5/365 15/323 |
| 6,178,591 | B1 | | 1/2001 | Dussourd |
| 6,261,330 | B1 | | 7/2001 | Dyson et al. |
| 6,481,050 | B1 | * | 11/2002 | Wilson ............. A47L 9/22 15/413 |
| 6,719,541 | B2 | * | 4/2004 | Bundy ............. A47L 5/22 417/366 |
| 6,807,709 | B2 | * | 10/2004 | Fernandez-Grandizo Martinez ......... A47L 9/22 15/327.2 |
| 7,722,709 | B2 | | 5/2010 | Conrad |
| 8,413,294 | B2 | * | 4/2013 | Lee ................. A47L 5/32 15/339 |
| 9,144,358 | B2 | * | 9/2015 | Smith ............. A47L 9/102 |
| 9,402,516 | B2 | | 8/2016 | Pilch |
| 9,532,691 | B2 | | 1/2017 | Box et al. |
| 2002/0066366 | A1 | | 6/2002 | Conrad et al. |
| 2003/0145426 | A1 | * | 8/2003 | Fernandez-Grandizo Martinez ......... A47L 9/22 15/413 |
| 2004/0010885 | A1 | * | 1/2004 | Hitzelberger ...... A47L 5/28 15/352 |
| 2004/0035093 | A1 | | 2/2004 | Conrad et al. |
| 2004/0088956 | A1 | | 5/2004 | Gammack |
| 2006/0059874 | A1 | | 3/2006 | Cho et al. |
| 2008/0016830 | A1 | | 1/2008 | Witter |
| 2010/0162516 | A1 | * | 7/2010 | Gierer ............. A47L 5/22 15/339 |
| 2012/0272474 | A1 | | 11/2012 | Follows et al. |
| 2012/0311814 | A1 | | 12/2012 | Kah, Jr. |
| 2013/0091662 | A1 | * | 4/2013 | Smith ............. A47L 9/1683 15/353 |
| 2013/0091810 | A1 | * | 4/2013 | Smith ............. A47L 9/0081 55/315.2 |
| 2013/0091812 | A1 | | 4/2013 | Smith |
| 2013/0091813 | A1 | * | 4/2013 | Smith ............. A47L 5/24 55/342.2 |
| 2013/0091815 | A1 | * | 4/2013 | Smith ............. A47L 9/102 55/346 |
| 2013/0111696 | A1 | * | 5/2013 | Morgan ............. A47L 5/30 15/347 |
| 2013/0305483 | A1 | * | 11/2013 | Dyson ............. A47L 9/122 15/353 |
| 2014/0325789 | A1 | * | 11/2014 | Hill ................. A47L 5/24 15/344 |
| 2015/0074936 | A1 | * | 3/2015 | Plato ............. A47L 9/0072 15/324 |
| 2015/0257617 | A1 | | 9/2015 | Marsden et al. |
| 2015/0320271 | A1 | | 11/2015 | Dimbylow et al. |
| 2016/0113465 | A1 | | 4/2016 | Box et al. |
| 2016/0113466 | A1 | * | 4/2016 | Box ............... A47L 9/22 15/353 |

FOREIGN PATENT DOCUMENTS

| | | |
|---|---|---|
| DE | 102 00 951 | 8/2003 |
| EP | 1 163 873 | 12/2001 |
| EP | 1 721 652 | 11/2006 |
| EP | 2 581 015 | 4/2013 |
| GB | 267580 | 3/1927 |
| GB | 514702 | 11/1939 |
| GB | 2 388 017 | 11/2003 |
| GB | 2468299 | 9/2010 |
| GB | 2486666 | 6/2012 |
| GB | 2513661 | 11/2014 |
| JP | 43-29422 | 12/1943 |
| JP | 52-14775 | 2/1977 |
| JP | 4-56450 | 5/1992 |
| JP | 4-116933 | 10/1992 |
| JP | 9-154784 | 6/1997 |
| JP | 2002-143042 | 5/2002 |
| JP | 2002-315698 | 10/2002 |
| JP | 2003-125995 | 5/2003 |
| JP | 2003-230515 | 8/2003 |
| JP | 2003-528704 | 9/2003 |
| JP | 2010-131158 | 6/2010 |
| JP | 2010-201169 | 9/2010 |
| JP | 2013-510696 | 3/2013 |
| KR | 2002-0071625 | 9/2002 |
| WO | WO-95/10972 | 4/1995 |
| WO | WO-00/21428 | 4/2000 |
| WO | WO-2005/099546 | 10/2005 |

OTHER PUBLICATIONS

Search Report dated Mar. 19, 2015, directed to GB Application No. 1418795.9; 2 pages.

Box et al., U.S. Office Action dated Aug. 4, 2017, directed to U.S. Appl. No. 14/919,600; 14 pages.

Box et al., U.S. Office Action dated Jan. 5, 2018, directed to U.S. Appl. No. 14/919,600; 9 pages.

* cited by examiner

VACUUM CLEANER WITH MOTOR COOLING

REFERENCE TO RELATED APPLICATION

This application claims priority of United Kingdom Application No. 1418795.9, filed Oct. 22, 2014, the entire contents of which are incorporated herein by reference.

FIELD OF THE INVENTION

The present invention relates to a vacuum cleaner having a motor that is cooled by air discharged from a dirt-separation stage.

BACKGROUND OF THE INVENTION

A vacuum cleaner typically comprises a vacuum motor that pulls dirt-laden air through one or more dirt-separation stages. The dirt-separation stages are typically located upstream of the vacuum motor in order to protect the vacuum motor from the dirt carried by the air. After passing through the dirt-separation stages, the cleansed air may be drawn through the interior of the vacuum motor in order to cool the motor.

SUMMARY OF THE INVENTION

The present invention provides a vacuum cleaner comprising a dirt-separation stage and a vacuum motor for moving air through the dirt-separation stage, wherein the vacuum motor comprises an impeller driven by an electric motor, the impeller is located upstream of the dirt-separation stage, the electric motor is located downstream of the dirt-separation stage, and at least part of the air discharged from the dirt-separation stage is used to cool the electric motor.

As air is drawn through the vacuum cleaner, there is a pressure drop across the dirt-separation stage. In contrast to a conventional vacuum cleaner, the dirt-separation stage is located downstream rather than upstream of the impeller. As a result, the air pressure at the inlet of the impeller is higher. Since the air pressure at the inlet is higher, the impeller imparts a greater pressure rise to the air. This greater pressure rise may then be used to increase the flow rate, increase the separation efficiency and/or decrease the power consumption of the vacuum cleaner.

At least part of the air discharged from the dirt-separation stage is used to cool the vacuum motor. As a result, the vacuum motor may operate at higher electrical power.

At least part of the air discharged from the dirt-separation stage may be pushed through the interior of the vacuum motor so as to cool the electric motor. If the vacuum cleaner as a whole were located upstream of the dirt-separation stage and if the air drawn into the vacuum motor were used to cool the electric motor, the dirt carried by the air may damage or otherwise shorten the lifespan of the electric motor. For example, the dirt may clog bearings or cover thermally-sensitive electrical components. By locating the dirt-separation stage downstream of the impeller but upstream of the electric motor, the advantages outlined above may be achieved whilst simultaneously cooling the electric motor using relatively clean air.

The air pushed through the interior of the vacuum motor may be used to cool one or more components of the electric motor. In particular, the air may flow over and cool an electrical winding and/or a power switch for controlling current in the winding. As a result, the winding and power switch are able to carry higher currents and thus the electric motor is able to operate at higher electrical power.

The vacuum motor may comprise a first inlet, a first outlet, a second inlet and a second outlet. The first inlet is then located upstream of the impeller, whilst the first outlet is located downstream of the impeller and upstream of the dirt-separation stage. The second inlet is then located downstream of the dirt-separation stage, whilst the second outlet is located downstream of the second inlet. At least part of the air discharged from the dirt-separation stage then enters the vacuum motor via the second inlet, flows over one or more components of the electric motor and exits the vacuum motor via the second outlet.

The dirt-separation stage may comprise a cyclonic separator. This then has the advantage that dirt may be removed from the air without the need for a filter or other means that requires washing or replacing.

The dirt-separation stage may comprise a plurality of cyclonic separators arranged around the vacuum motor. By employing a plurality of cyclonic separators, a relatively high separation efficiency may be achieved for the dirt separation stage. By arranging the cyclonic separators around the vacuum motor, a relatively short and/or straight path may be taken between the outlet of the vacuum motor and the inlet of each of the cyclonic separators. As a result, relatively high speeds may be achieved for the air entering the cyclonic separators, thereby improving the separation efficiency.

The dirt-separation stage may comprise a plurality of channels, each channel extending from an outlet of the vacuum motor to an inlet of a respective cyclonic separator. The channels may then be used to avoid abrupt changes in the speed of the air as it moves from the vacuum motor to the cyclonic separators, thereby reducing flow losses. In particular, the channels may be used to ensure that the relatively high speed of the air exiting the vacuum motor is largely maintained on entering the cyclonic separators.

The inlet angle of each channel may be defined so as to minimise the incidence angle of the air entering the channel during normal use of the vacuum cleaner. As a result, flow losses are reduced. The absolute flow angle at which the air exits the impeller may be in excess of 30 degrees. Accordingly, each channel may have an inlet angle of at least 30 degrees.

Each channel may be substantially straight. Consequently there is no or relatively little turning of the air as it moves along the channel By contrast, if the air were forced to follow a tortuous path between the vacuum motor and the cyclonic separators, flow losses would be greater and thus the speed of the air entering the cyclonic separators would be slower.

The impeller may be a centrifugal impeller, which has the advantage of being able to achieve relatively high flow rates in relation to its size. Air then enters the vacuum motor in an axial direction (i.e. in a direction parallel to the rotational axis of the vacuum motor), and exits in a radial direction (i.e. in a direction normal to the rotational axis of the vacuum motor). Since the air exits in a radial direction, it is not necessary to turn the air exiting the impeller and thus flow losses are reduced. Furthermore, where the dirt-separation stage comprises a plurality of cyclonic separators arranged around the vacuum motor, a relatively straight path may be established between the outlet of the vacuum motor and the inlet to each of the cyclonic separators, thereby further reducing losses.

The vacuum cleaner may comprise a further dirt-separation stage, and the impeller may be located downstream of the further dirt separation stage. The further dirt-separation stage may then be used to remove dirt that would otherwise block, jam or damage the impeller. For example, the further dirt-separation stage may be used to remove relatively coarse dirt, whilst the dirt-separation stage may be used to remove relatively fine dirt from the air.

The further dirt-separation stage may comprise a cyclonic separator. Dirt that might otherwise black, jam or damage the impeller may then be removed without the need for a filter or other means that would require washing or replacing.

Where the first dirt-separation stage comprises a cyclonic separator, the cyclonic separator may have a central axis about which air within the cyclonic separator rotates. The vacuum motor may then comprise a rotational axis about which the impeller rotates, and the central axis and the rotational axis may be coincident. As a consequence, a relatively straight path may then be taken by the air as it moves from the further dirt-separation stage to the vacuum motor, thus reducing flow losses.

The dirt-separation stage may comprise a dirt collector, the further dirt-separation stage may comprise a further dirt collector, and the further dirt collector may surround the dirt collector. As a result, a relatively compact arrangement may be realised. The further dirt-separation stage may be used to remove relatively coarse dirt whilst the dirt-separation stage may be used to remove relatively fine dirt. Since the further dirt collector surrounds the dirt collector, a relatively large volume may be achieved for the further dirt collector whilst maintaining a relatively compact overall size.

BRIEF DESCRIPTION OF THE DRAWINGS

In order that the present invention may be more readily understood, an embodiment of the invention will now be described, by way of example, with reference to the accompanying drawings, in which.

DETAILED DESCRIPTION OF THE INVENTION

Figure 1:
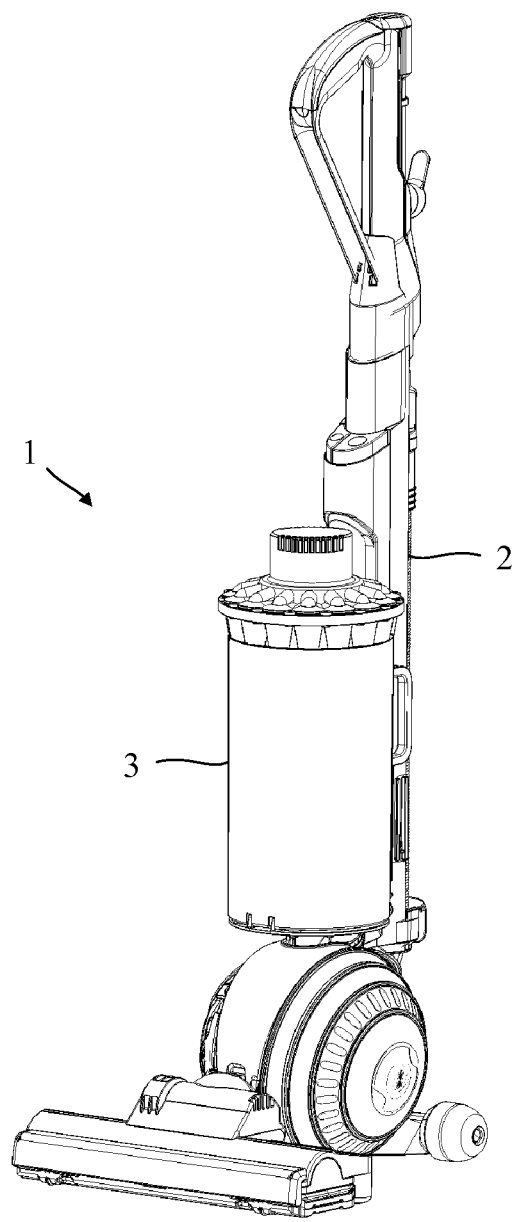
FIG. 1 is a perspective view of a vacuum cleaner in accordance with the present invention.
Figure 2:
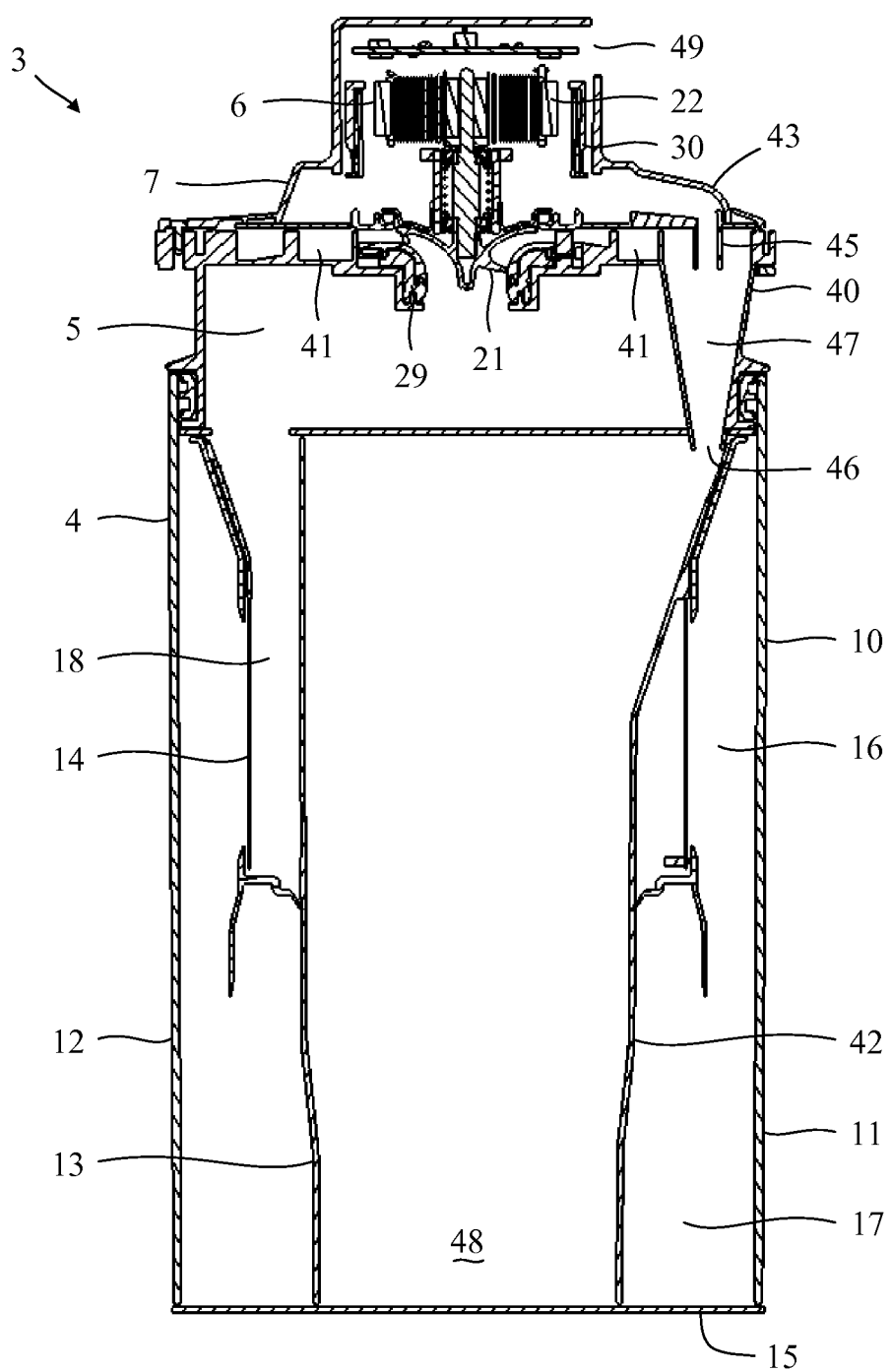
FIG. 2 is a sectional slice through the centre of a dirt separator of the vacuum cleaner, the sectional slice being taken in the vertical plane.
Figure 3:
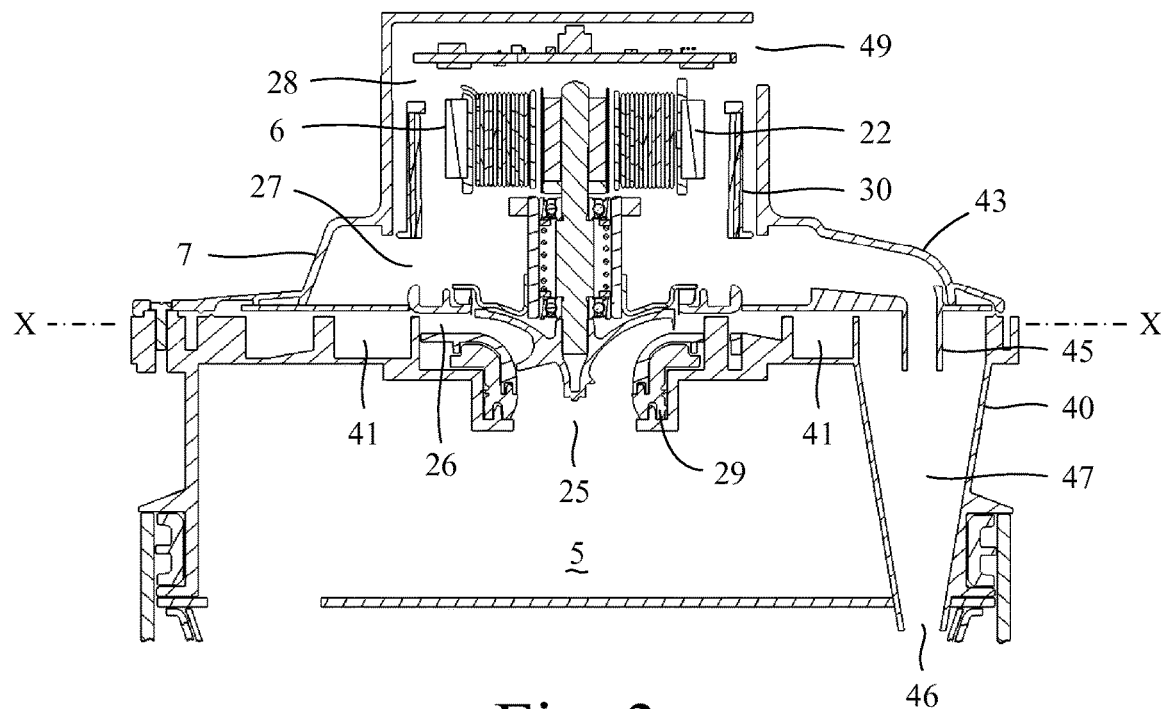
FIG. 3 is an enlarged view of the upper portion of the sectional slice of FIG. 2.

The vacuum cleaner 1 of FIG. 1 comprises a main body 2 to which a dirt separator 3 is removably attached.

Referring now to FIGS. 2 to 7, the dirt separator 3 comprises a first dirt-separation stage 4, a motor plenum 5, a vacuum motor 6, and a second dirt-separation stage 7.

The first dirt-separation stage 4 comprises a cyclonic separator 10 and a dirt collector 11. The cyclonic separator 10 and the dirt collector 11 are defined by an outer wall 12, an inner wall 13, a shroud 14, and a base 15. The outer wall 12 is cylindrical in shape and surrounds the inner wall 13 and the shroud 14. The inner wall 13 is generally cylindrical in shape and is arranged concentrically with the outer wall 12. The upper part of the inner wall 13 is fluted, with the flutes providing passageways along which dirt separated by the cyclonic separators 40 of the second dirt-separation stage 7 are guided to a further dirt collector 42. The shroud 14 is located between the outer wall 12 and the inner wall 13 and comprises a mesh through which air is permitted to pass.

The upper end of the outer wall 12 is closed off by a wall of the second dirt-separation stage 7. The lower ends of the outer wall 12 and the inner wall 13 are closed off by the base 15. The outer wall 12, the inner wall 13, the shroud 14 and the base 15 thus collectively define a chamber. The upper part of this chamber (i.e. that part generally defined between the outer wall 12 and the shroud 14) defines a cyclone chamber 16, whilst the lower part of the chamber (i.e. that part generally defined between the outer wall 12 and the inner wall 13) defines a dirt-collection chamber 17. The first dirt-separation stage 4 therefore comprises a cyclonic separator 10 and a dirt collector 11 located below the cyclonic separator 10.

The outer wall 12 includes an opening (not shown) that serves as an inlet to the first dirt-separation stage 4. The space between the shroud 14 and the inner wall 13 defines a passageway 18 that is closed at a lower end and is open at an upper end. The upper end then serves an outlet for the first dirt-separation stage 4.

The motor plenum 5 is located above the first dirt-separation stage 4 and serves to connect fluidly the outlet of first-dirt separation stage 4 with the inlet of the vacuum motor 6.

The vacuum motor 6 comprises a housing 20, an impeller 21, and an electric motor 22. The impeller 21 is a centrifugal impeller that is driven by the electric motor 22. The housing 20 is generally cylindrical in shape, is closed at a front end and is open at a rear end. The impeller 21 and the electric motor 22 are then housed within the housing 20 such that the impeller 21 is adjacent the front end.

The housing 20 comprises a first inlet 25 located upstream of the impeller 21, a first outlet 26 located downstream of the impeller 21, a second inlet 27 located downstream of the first outlet 26, and a second outlet 28 located downstream of the second inlet 27. The first inlet 25 comprises a circular opening located in the front end of the housing 20. The first outlet 26 comprises an annular opening formed around the side of the housing 20. The second inlet 27 comprises a plurality of apertures that are again formed around the side of the housing 20. The second inlet 27 is located rearward of the first outlet 26, which is to say that, relative to the first outlet 26, the second inlet 27 is located further towards the rear of the housing 20. Finally, the second outlet 28 comprises a plurality of apertures that are defined between the open rear end of the housing 20 and the electric motor 22.

The first inlet 25 is aligned with the inlet of the impeller 21, whilst the first outlet 26 is aligned with and surrounds the outlet of the impeller 21. In being a centrifugal impeller, air enters the impeller 21 in an axial direction (i.e. in a direction parallel to the rotational axis) and exists in a radial direction (i.e. in a direction normal to the rotational axis). Consequently, air enters the vacuum motor 6 via the first inlet 25 in an axial direction, and exits the vacuum motor 6 via the first outlet 26 in a radial direction. As explained below, air discharged from the second dirt-separation stage 7 re-enters the vacuum motor 6 via the second inlet 27, flows over and cools components of the electric motor 22, and exits via the second outlet 28.

The vacuum motor 6 is mounted within the second dirt-separation stage 7 by means of an axial mount 29 and a radial mount 30. Both mounts 29,30 are formed of an elastomeric material and act to isolate the second dirt-separation stage 7 and thus the remainder of the dirt separator 3 from the vibration generated by the vacuum motor 6. The axial mount 29 is attached to the front end of the housing 20 and abuts a wall of the second dirt-separation stage 7 so as to form a seal. During use, the axial mount 29 deforms to absorb vibration of the vacuum motor 6 in an axial direction, i.e. in a direction parallel to the axis of rotation of the vacuum motor 6. The radial mount 30 is attached to the side of the housing 20 and comprises a sleeve 31 that surrounds the housing 20, a lip seal 32 located at one end of the sleeve 31, and a plurality of ribs 33 that extend axially along the sleeve 31. The radial mount 30 abuts a wall of the second dirt-separation stage 7 such that the lip seal 32 forms a seals against the wall, whilst the ribs 33 are crushed slightly. During use, the ribs 33 further deform to absorb vibration of the vacuum motor 6 in a radial direction, i.e. in a direction normal to the axis of rotation of the vacuum motor 6.

The second dirt-separator stage 7 comprises a plurality of cyclonic separators 40, a plurality of channels 41, a dirt collector 42, and a cover 43.

The cyclonic separators 40 are arranged in a ring about the vacuum motor 6. Each cyclonic separator 40 is frusto-conical in shape and comprises a tangential inlet 44, an air outlet 45, and a dirt outlet 46. The interior of each cyclonic separator 40 defines a cyclone chamber 47. During use, air enters the cyclone chamber 47 via the tangential inlet 44. Dirt separated within the cyclone chamber 47 is then discharged through the dirt outlet 46 whilst the cleansed air exits through the air outlet 45.

Each channel 41 extends linearly from the first outlet 26 of the vacuum motor 6 to the inlet 44 of a respective cyclonic separator 40. The cyclonic separators 40 are positioned relative to the vacuum motor 6 such that the inlet 44 of each cyclonic separator 40 is located roughly at the same level as the first outlet 26. The height of each inlet 44 is greater than the height of the first outlet 26. Accordingly, each channel 41 increases in height as it extends from the first outlet 26 to the inlet 44. Additionally, the channel 41 decreases in width as it extends between the first outlet 26 and the inlet 44. This then ensures that the cross-sectional area of the channel 41 is relatively constant along its length, the advantages of which are explained below.

Figure 4:
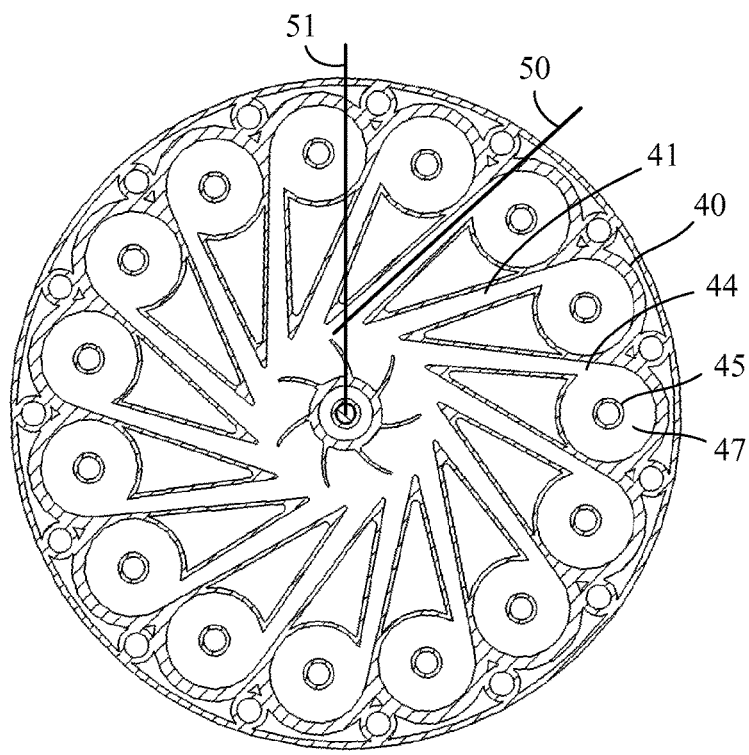
FIG. 4 is a sectional slice through the dirt separator, the sectional slice being taken in the horizontal plane indicated by the line X-X in FIG. 3.

As illustrated in FIG. 4, each channel 41 has a centreline 50 that extends from the inlet to the outlet of the channel 41. Each channel 41 then has an inlet angle $\alpha$ defined by the intersection of (i) the tangent to the centreline 50 at the inlet of the channel 41, and (ii) the radial axis 51 of the impeller 21 extending through the centre of the inlet of the channel 41. The term 'inlet angle' is therefore used in the same manner as that employed in compressor technology when referring to the blades or vanes of a diffuser. For example, the inlet angle of a diffuser vane is defined as the angle between (i) the tangent to the camber line at the leading edge of the vane, and (ii) the radial axis of the impeller extending through the leading edge of the vane. The channels 41 of the second dirt-separation stage 7 resemble a channel diffuser. However, in contrast to a conventional channel diffuser, which seeks to decelerate the airflow in order to increase the static pressure, the channels 41 of the second dirt-separation stage 7 does not attempt to decelerate the airflow; the reasons for this are set out below.

Figure 5:
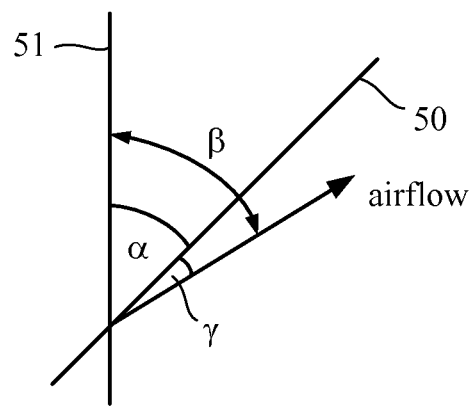
FIG. 5 illustrates the inlet angle (a) of a channel of the dirt separator, the absolute flow angle (β) of the airflow entering the channel, and the resulting incidence angle (γ)
Figure 6:
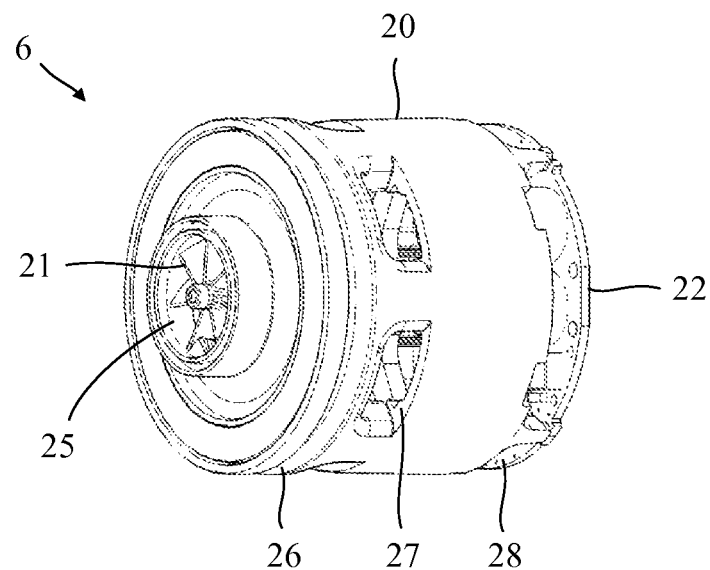
FIG. 6 is a perspective view of a vacuum motor forming part of the dirt separator.
Figure 7:
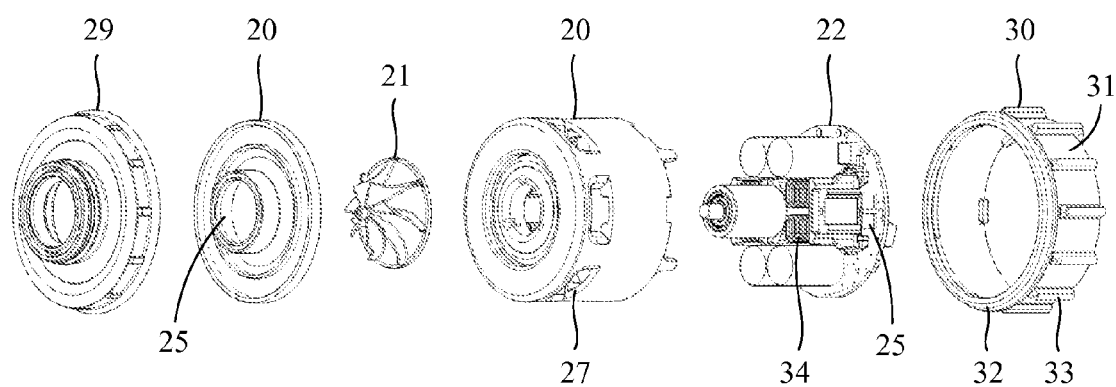
FIG. 7 is an exploded view of the vacuum motor along with a pair of mounts used to mount the vacuum motor.

Referring now to FIG. 5, the inlet angle $\alpha$ of each channel 41 is defined so as to minimise the incidence angle $\gamma$ of the airflow. During normal use of the vacuum cleaner 1, the flow rate of the airflow passing through the cyclonic separator 3 will vary, e.g. as the vacuum cleaner 1 is used on different surfaces. As the flow rate varies, so too does the absolute flow angle $\beta$ of the airflow exiting the impeller 21. For example, the flow rate may vary between 5 l/s and 15 l/s. At the lower flow rate, the vacuum motor 6 rotates at a higher speed due to the reduced load and thus the airflow exits the impeller 21 at a higher flow angle of, say, 65 degrees. At the upper flow rate, the vacuum motor 6 rotates at a lower speed due to the increased load and thus the airflow exits the impeller 21 at a lower flow angle of, say, 35 degrees. The average flow rate during normal use may be, say, 10 l/s resulting in an absolute flow angle of 50 degrees. The inlet angle $\alpha$ of each channel is therefore defined as 50 degrees so as to minimise the incidence angle $\gamma$.

The dirt collector 42 is defined by the inner wall 13 and the base 15. More particularly, the interior space bounded by the inner wall 13 and the base 15 defines a dirt-collection chamber 48. The dirt collectors 11,42 of the two dirt-separation stages 4,7 are therefore adjacent. Moreover, the dirt collector 11 of the first dirt-separation stage 4 surrounds the dirt collector 42 of the second dirt-separation stage 7. As explained below, the first dirt-separation stage 4 is intended to remove relatively coarse dirt, whilst the second dirt-separation stage 7 is intended to remove relatively fine dirt. By having a first dirt collector 11 that is outermost and surrounds a second dirt collector 42, a relatively large volume may be achieved for the first dirt collector 11 whilst achieving a relatively compact overall size for the dirt separator 3.

The bottom of each cyclonic separator 40 projects into the dirt collector 42 such that dirt separated by the cyclonic separator 40 is discharged through the dirt outlet 46 and falls into the dirt-collection chamber 48. As noted above, the upper part of the inner wall 13 is fluted. The flutes provide passageways along which the dirt separated by the cyclonic separators 40 is guided to the bottom of the dirt-collection chamber 48.

The cover 43 overlies the cyclonic separators 40 and the vacuum motor 6. The cover 43 acts to guide the cleansed air discharged from the cyclonic separators 40 to the second inlet 27 of the vacuum motor 6. The lip seal 32 of the radial mount 30 forms an annular seal against the cover 43 such that all air discharged from the cyclonic separators 40 re-enters the vacuum motor 6 via the second inlet 27. The cover 43 comprises a plurality of exhaust vents 49 located above the vacuum motor 6. Air discharged from the vacuum motor 6 via the second outlet 28 is then exhausted from the dirt separator 3 and the vacuum cleaner 1 via the exhaust vents 49.

During use, the vacuum motor 6 pulls dirt-laden air in through a suction inlet of the vacuum cleaner 1. The dirt-laden air is then carried via ducting from the suction inlet to the dirt separator 3. The dirt-laden air enters the first dirt-separation stage 4 via the inlet in the outer wall 12. The dirt-laden air then spins within the cyclone chamber 16 causing relatively coarse dirt to be separated. The coarse dirt collects in the dirt-collection chamber 17, whilst the partially cleansed air is pulled through the shroud 14, up through the passageway 18, and into the motor plenum 5. From the motor plenum 5, the partially cleansed air is pulled into the vacuum motor 6 via the first inlet 25. The air is then discharged from the vacuum motor 6 via the first outlet 26. The partially cleansed air is then pushed along the channels 41 of the second dirt-separation stage 7 and into the cyclonic separators 40 via the tangential inlets 44. The partially cleansed air then spins within the cyclone chambers 47 causing relatively fine dirt to be separated. The fine dirt is discharged through the dirt outlet 46 and collects in the dirt-collection chamber 48, whilst the cleansed air is discharged through the air outlet 45. From there, the cleansed fluid is pushed into the vacuum motor 6 via the second inlet 27. The cleansed air is then pushed through the interior of the vacuum motor 6 causing components of the electric motor 22 to be cooled. Finally, the cleansed, heated air is discharged from the vacuum motor 6 via the second outlet 28 and is exhausted from the vacuum cleaner 1 via the exhaust vents 49 in the cover 43.

The first dirt-separation stage 4 is located upstream of the impeller 21, whilst the second dirt-separation stage 7 is located downstream of the impeller 21. Consequently, air is pulled through the first dirt-separation stage 4 but is pushed through the second dirt separation stage 7. This arrangement contrasts with a conventional vacuum cleaner in which both dirt-separation stages are located upstream of the vacuum motor. As air passes through a dirt-separation stage, there is a pressure drop in the airflow. Since the second dirt-separation stage 7 is located downstream of the impeller 21, the pressure drop associated with the second dirt-separation stage 7 occurs downstream of the impeller 21. As a result, the pressure at the inlet of the impeller 21 is higher in comparison to a conventional arrangement in which both dirt-separation stages are located upstream of the impeller. Consequently, for the same shaft power generated by the electric motor 22, a greater pressure rise is imparted to the air by the impeller 21. This greater pressure rise may then be used to increase the flow rate, increase the separation efficiency and/or decrease the power consumption of the vacuum cleaner 1, as will now be explained.

If the shaft power of the electric motor 22 and the separation efficiencies of the dirt-separation stages 4,7 are unchanged, the greater pressure rise generated by the impeller 21 will result in a higher flow rate through the vacuum cleaner 1. As a result, greater suction power will be generated at the suction inlet of the vacuum cleaner 1. Rather than increasing the flow rate, the greater pressure rise generated by the impeller 21 may instead be used to increase the separation efficiency of one or both of the dirt-separation stages 4,7. As the separation efficiency of a dirt-separation stage increases, so too does the pressure drop associated with the stage. Accordingly, the greater pressure rise may be used to increase the separation efficiency of one or both of the dirt-separation stages 4,7 whilst maintaining the same flow rate through the vacuum cleaner 1. Finally, rather than increasing the flow rate or the separation efficiency, the shaft power of by the electric motor 22 may be reduced so that the same flow rate and separation efficiency are achieved. As a result, the same cleaning performance is achieved but at a lower power consumption.

In view of the benefits in locating the second dirt-separation stage 7 downstream of the impeller 21, one might be tempted to locate the first dirt-separation stage 4 downstream of the impeller 21. This would then further increase the pressure at the inlet of the impeller 21. However, locating the first dirt-separation stage 4 downstream of the impeller 21 would then expose the impeller 21 to all of the dirt that is drawn into the vacuum cleaner 1. By locating the first dirt-separation stage 4 upstream of the impeller 21, relatively coarse dirt, which might otherwise block, jam or damage the impeller 21, is first removed from the airflow. The impeller 21 is therefore exposed only to relatively fine dirt carried by the partially cleansed air.

The vacuum motor 6 comprises a centrifugal impeller 21, which has the advantage of relatively high flow rates in relation to its size. As a consequence of employing a centrifugal impeller, air enters the impeller 21 in an axial direction, and exits in a radial direction. The housing 20 includes an outlet 26 that surrounds the outlet of the impeller 21. As a result, it is not necessary to turn the air exiting the impeller 21 within the housing 20, thereby reducing flow losses. Additionally, the air exiting the vacuum motor 6 moves at relatively high speed, which as will now be explained has significant advantages for the separation efficiency of the second dirt-separation stage 7.

The cyclonic separators 40 of the second dirt-separation stage 7 are arranged around the vacuum motor 6. As a result, a relatively short and straight path is provided for the airflow as it moves from the first outlet 26 of the vacuum motor 6 to the inlets 44 of the cyclonic separators 40. This then helps reduce flow losses that would otherwise arise if the airflow were forced to follow a tortuous path between the vacuum motor 6 and the cyclonic separators 40. The first outlet 26 of the vacuum motor 6 is located roughly at the same level as the inlet 44 to each cyclonic separator 40. In particular, the first outlet 26 lies in a plane that passes though the inlet 44 of each cyclonic separator 40. As a result, there is relatively little turning of the air in an axial direction, thereby reducing flow losses.

The channels 41 help to ensure that the speed of the air exiting the vacuum motor 6 is maintained at the inlets 44 to the cyclonic separators 40. To this end, each channel 41 is straight and has an inlet angle $\alpha$ that serves to minimise the incidence angle $\gamma$ of the airflow during normal use of the vacuum cleaner 1. Additionally, the cross-sectional area of each channel 41 is constant along the length of the channel 41. As a result, the relatively high speed of the air exiting the vacuum motor 6 is largely maintained at the inlets 44 of the cyclonic separators 40. This then has the advantage of improving the separation efficiency of the cyclonic separators 40.

In a conventional vacuum cleaner having cyclonic separators located upstream of a vacuum motor, the air is typically accelerated at the inlets to the cyclonic separators, which act as nozzles for the airflow. The air discharged from the cyclonic separators then flows into a plenum, causing the airflow to decelerate. Finally, the air is again accelerated at the vacuum motor. The airflow is therefore subjected to abrupt changes in speed as the airflow moves between the cyclonic separators and the vacuum motor. However, with each abrupt change in speed, the airflow experiences flow losses. With the vacuum cleaner 1 of the present invention, the channels 41 act to prevent abrupt changes in speed as the airflow moves between the vacuum motor 6 and the cyclonic separators 40, thereby reducing flow losses.

The cross-sectional area of each channel 41 is constant along its length. As a result, the speed of the airflow entering the cyclonic separators 40 is largely the same as that exiting the vacuum motor 6. However, depending on the particular design of the cyclonic separators 40 (e.g. size, shape and number) as well as the speed of the airflow exiting the vacuum motor 6, it may be desirable to either accelerate or decelerate the airflow. Accordingly, the cross-sectional area of each channel 41 may decrease or increase gradually along its length. Nevertheless, in contrast to the conventional vacuum cleaner described in the previous paragraph, the airflow does not undergo an abrupt change in speed on its path from the vacuum motor 6 to the cyclonic separators 40.

As noted above, the inlet angle α of each channel 41 is ideally defined so as to minimise the incidence angle α. The inlet angle will therefore depend on the absolute flow angle β of the airflow exiting the vacuum motor 6, which in turn depends on the design of the impeller 21 and the speed of rotation of the electric motor 22. Since the vacuum motor 6 forms part of the dirt separator 3 and the dirt separator 3 is removable from the main body 2, it is desirable to employ a vacuum motor 6 that is relatively compact and light in weight. In order to achieve a relatively compact size and light weight whilst achieving the desired flow rate, relatively high speeds of rotation are likely. Accordingly, the absolute flow angle at which the air exits the impeller 21 is likely to be in excess of 30 degrees. Each channel 41 would then have an inlet angle α of at least 30 degrees.

The vacuum motor 6 is located directly above the first dirt-separation stage 4. Additionally, the central axis of the cyclonic separator 10 (i.e. the axis about which air rotates within the cyclone chamber 16) and the rotational axis of the vacuum motor 6 are coincident. As a result, a relatively short and straight path is taken by the air as it moves from the first dirt-separation stage 4 to the vacuum motor 6, thereby reducing flow losses.

The two dirt-separation stages 4,7 form part of a common dirt separator 3 that is removable from the main body 2. This then has the advantage that the dirt separator 3 may be removed, carried to a bin and the dirt collected by both separation stages 4,7 may be emptied together in a single action. For example, the base 15 may pivot relative to the outer wall 12 in order to empty both dirt-collection chambers 17,48. The vacuum motor 6 also forms part of the dirt separator 3. Whilst this has the disadvantage of increasing the size and weight of the dirt separator 3, it has the advantage that a shorter and less tortuous path is taken by the air when moving from the first dirt-separation stage 4 to the vacuum motor 6 and when moving from the vacuum motor 6 to the second dirt-separation stage 7. As a result, flow losses are reduced.

The first dirt-separation stage 4 comprises a cyclonic separator 10, which has the advantage that relatively coarse dirt may be removed without the need for a filter or other means that would require washing or replacing. Nevertheless, the first dirt-separation stage 4 may comprise alternative means, such as a washable filter, for removing dirt that would otherwise block, jam or damage the impeller 21.

The cleansed air discharged from the second dirt-separation stage 7 is pushed through the interior of the vacuum motor 6 and is used to cool components of the electric motor 22. In particular, the cleansed air flows over and cools electrical windings 34 and power switches 35 that are used to control the flow of current through the windings 34. As a result, the electric motor 22 is able to operate at higher electrical power. If the vacuum cleaner 6 as a whole were located upstream of the second dirt-separation stage 7 and if the air drawn through the vacuum motor 6 were used to cool the electric motor 22, the fine dirt carried by the airflow may damage or otherwise shorten the lifespan of the electric motor 22. For example, the dirt may clog bearings or cover thermally-sensitive electrical components. By locating the second dirt-separation stage 7 downstream of the impeller 21 but upstream of the electric motor 22, the advantages outlined above regarding a greater pressure rise may be achieved whilst simultaneously cooling the electric motor 22 using relatively clean air.

All of the air discharged from the second dirt-separation stage 7 is pushed through the interior of the vacuum motor 6. This then has the advantage of maximising cooling since all of the available air is returned through the vacuum motor 6. Nevertheless, the path through the vacuum motor 6 may be relatively restrictive. It may therefore be desirable to push only a part of the airflow through the vacuum motor 6. The remainder of the airflow would then bypass the second inlet 27 and instead flow along the outside of the vacuum motor 6. This may be achieved, for example, by adapting the radial mount 30 such that the lip seal 32 forms only a partial seal. By pushing only part of the airflow through the interior of the vacuum motor 6, the flow rate should increase owing to the less restrictive path formed by the bypass. If cooling of the electric motor 22 is not a concern or can be achieved by other means, pushing the air from the second dirt-separation stage 7 through the interior of the vacuum motor 6 may be avoided altogether. Alternatively, if the housing 20 is made of metal or some other material having a high thermal conductivity then it may be possible to achieve sufficient cooling of the electric motor 22 by passing the air along the outside of the vacuum motor 6.

The invention claimed is:

1. A vacuum cleaner comprising a dirt-separation stage and a vacuum motor for moving air through the dirt-separation stage, wherein the vacuum motor comprises a housing and an impeller driven by an electric motor, the impeller is located upstream of the dirt-separation stage, the electric motor is located downstream of the dirt-separation stage, and the vacuum cleaner is configured to direct at least part of the air discharged from the dirt-separation stage to the electric motor to cool the electric motor, and wherein the housing of the vacuum motor has a first inlet, a first outlet, a second inlet, and a second outlet, the first inlet is located upstream of the impeller, the first outlet is located downstream of the impeller and upstream of the dirt-separation stage, the second inlet is located downstream of the dirt-separation stage, the second outlet is located downstream of the second inlet, and at least part of the air discharged from the dirt-separation stage enters the vacuum motor via the second inlet, flows over one or more components of the electric motor and exits the vacuum motor via the second outlet.

2. The vacuum cleaner of claim 1, wherein at least part of the air discharged from the dirt-separation stage is pushed through the interior of the vacuum motor so as to cool the electric motor.

3. The vacuum cleaner of claim 2, wherein the air pushed through the interior of the vacuum motor flows over and cools at least one of an electrical winding and a power switch for controlling current in the electrical winding.

4. The vacuum cleaner of claim 1, wherein the dirt-separation stage comprises a plurality of cyclonic separators arranged around the vacuum motor.

5. The vacuum cleaner of claim 4, wherein the dirt-separation stage comprises a plurality of channels, each channel extending from an outlet of the vacuum motor to an inlet of a respective cyclonic separator.

6. The vacuum cleaner of claim 5, wherein each channel has an inlet angle of at least 30 degrees.

7. The vacuum cleaner of claim 5, wherein each channel is substantially straight.

8. The vacuum cleaner of claim 1, wherein the vacuum cleaner comprises a further dirt-separation stage, and the impeller is located downstream of the further dirt separation stage.

9. The vacuum cleaner of claim 8, wherein the further dirt-separation stage comprises a cyclonic separator.

10. The vacuum cleaner of claim 9, wherein the cyclonic separator of the further dirt-separation stage comprises a central axis about which air within the cyclonic separator rotates, the vacuum motor comprises a rotational axis about which the impeller rotates, and the central axis and the rotational axis are coincident.

11. The vacuum cleaner of claim 8, wherein the dirt-separation stage comprises a dirt collector, the further dirt-separation stage comprises a further dirt collector, and the further dirt collector surrounds the dirt collector.

12. A vacuum cleaner comprising a first dirt-separation stage, a second dirt-separation stage, and a vacuum motor for moving air through the first dirt-separation stage and the second dirt-separation stage, wherein the second dirt-separation stage comprises a cyclonic separator, the vacuum motor comprises an impeller driven by an electric motor, the impeller is located downstream of the first dirt-separation stage and upstream of the second dirt-separation stage such that air flows through the first dirt-separation stage, then through the impeller, and then through the second dirt-separation stage, the electric motor is located downstream of the second dirt-separation stage, and the vacuum cleaner is configured to direct at least part of the air discharged from the second dirt-separation stage to the electric motor to cool the electric motor.

13. The vacuum cleaner of claim 12, wherein at least part of the air discharged from the second dirt-separation stage is pushed through the interior of the vacuum motor so as to cool the electric motor.

14. The vacuum cleaner of claim 12, wherein the air pushed through the interior of the vacuum motor flows over and cools at least one of an electrical winding and a power switch for controlling current in the electrical winding.

15. The vacuum cleaner of claim 12, wherein the second dirt-separation stage comprises a plurality of cyclonic separators arranged around the vacuum motor.

16. The vacuum cleaner of claim 15, wherein the second dirt-separation stage comprises a plurality of channels, each channel extending from an outlet of the vacuum motor to an inlet of a respective cyclonic separator.

17. The vacuum cleaner of claim 16, wherein each channel has an inlet angle of at least 30 degrees.

18. The vacuum cleaner of claim 16, wherein each channel is substantially straight.

19. The vacuum cleaner of claim 12, wherein the first dirt-separation stage comprises a cyclonic separator.

20. The vacuum cleaner of claim 19, wherein the cyclonic separator of the first dirt-separation stage comprises a central axis about which air within the cyclonic separator rotates, the vacuum motor comprises a rotational axis about which the impeller rotates, and the central axis and the rotational axis are coincident.

* * * * *